United States Patent [19]

Parks et al.

[11] 4,332,299

[45] Jun. 1, 1982

[54] CULTIVATOR DEVICE FOR A VEHICLE

[75] Inventors: Alvin L. Parks; W. D. McAlexander, both of Milton-Freewater, Oreg.

[73] Assignee: Eldon K. Chinn, Milton-Freewater, Oreg.

[21] Appl. No.: 161,064

[22] Filed: Jun. 19, 1980

[51] Int. Cl.³ .................. A01B 33/06; A01B 39/08; A01B 39/16
[52] U.S. Cl. .................................. 172/98; 172/117; 172/111; 172/305; 172/739; 172/743
[58] Field of Search ................. 172/38, 98, 111, 117, 172/297, 305, 456, 459, 662, 739, 743, 5, 24

[56] References Cited

U.S. PATENT DOCUMENTS

| | | | |
|---|---|---|---|
| 2,664,802 | 1/1954 | Myer | 172/6 |
| 2,665,621 | 1/1954 | Smith et al. | 172/98 X |
| 2,706,441 | 4/1955 | Caldwell et al. | 56/295 |
| 2,718,836 | 9/1955 | Pertics et al. | 172/99 |
| 2,764,077 | 9/1956 | Pertics et al. | 172/99 X |
| 2,788,729 | 4/1957 | Hill | 172/305 X |
| 2,898,725 | 8/1959 | Roesel | 56/295 |
| 3,087,296 | 4/1963 | Cowles | 56/295 |
| 3,115,739 | 12/1963 | Thoen et al. | 172/38 X |
| 3,117,632 | 1/1964 | Caggiano | 172/98 X |
| 3,138,208 | 6/1964 | Simms | 172/111 X |
| 3,274,762 | 9/1966 | Jolls | 56/295 |
| 3,797,211 | 3/1974 | Turner | 56/15.6 |
| 3,913,681 | 10/1975 | Lincoln et al. | 172/99 X |
| 4,048,789 | 9/1977 | Cartner | 56/11.9 |
| 4,287,955 | 9/1981 | Anderson | 172/98 |

OTHER PUBLICATIONS

"The Goodfruit Grower/The Goodgrape Grower", Jul. 15, 1979, p. 15.

Primary Examiner—George J. Marlo
Attorney, Agent, or Firm—Klarquist, Sparkman, Campbell, Leigh, Whinston and Dellett

[57] ABSTRACT

A cultivator attachment is mounted to the side of a tractor and includes an outwardly projecting boom assembly with first and second boom sections. The boom sections telescope and a cultivator head with a rotating cultivator member is connected to the free end of the second boom section. A first hydraulic cylinder raises and lowers the boom assembly while a second such cylinder extends and retracts the second boom section to move the cultivator head inwardly toward and outwardly away from the tractor to avoid obstacles in its path. A hydraulic motor on the head rotates the cultivator member about its axis. A side tilt mechanism located at the free end of the second boom section tilts the axis of the cultivator member in the plane of the boom assembly to direct the discharge of material from the cultivator head toward or away from the tractor during cultivation. A boom assembly attachment mechanism permits rotation of the boom assembly about its longitudinal axis to orbit the cultivator head about the boom axis to control the forward and rearward discharge of material from the cultivator member as desired. In the event the boom assembly or cultivator head hits a solid object, a link shock absorber operates to absorb the energy of impact. A separate hydraulic fluid tank is included in the hydraulic circuit for the cultivator head motor and this tank forms an integral part of the mounting system for the attachment.

8 Claims, 8 Drawing Figures

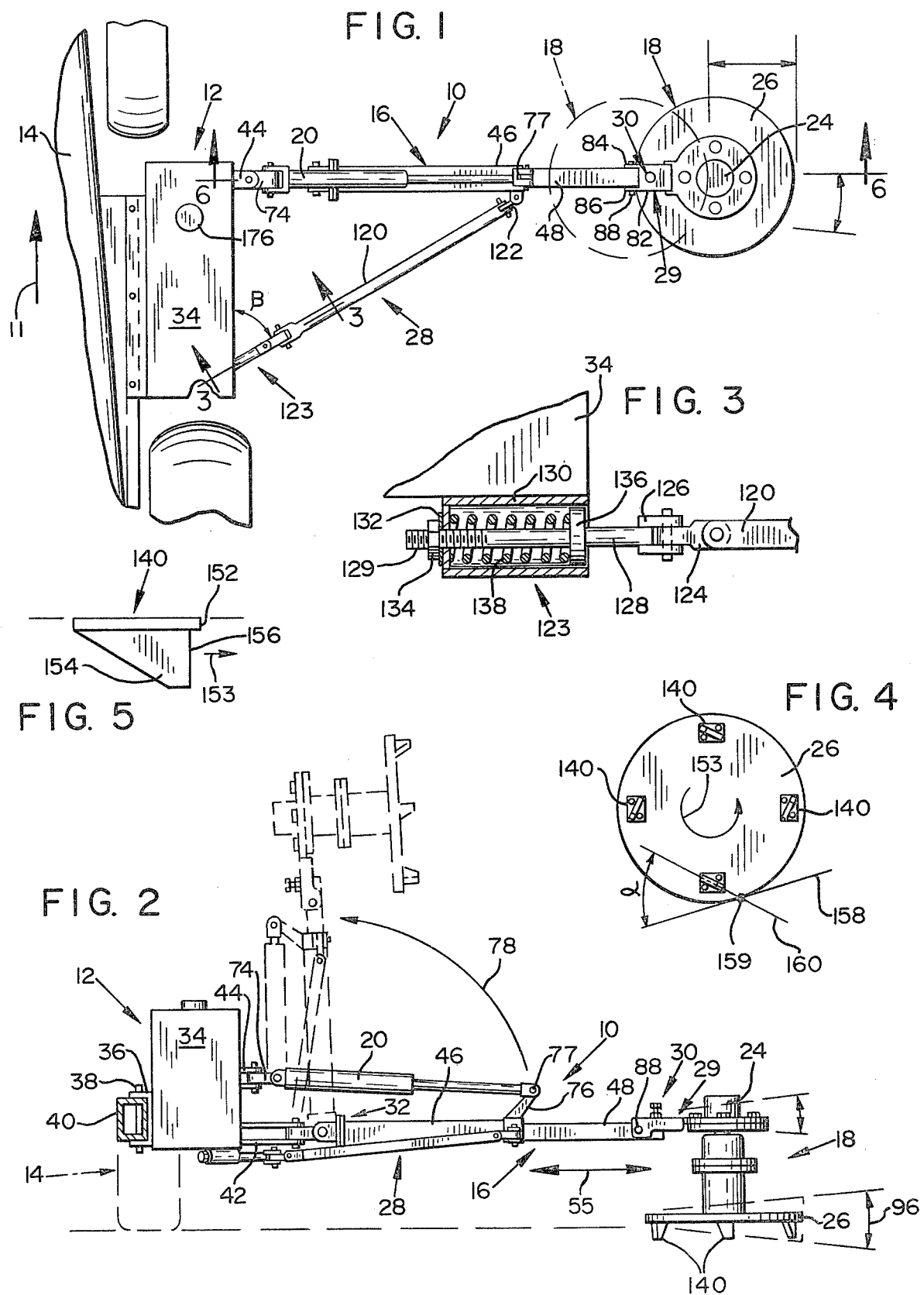

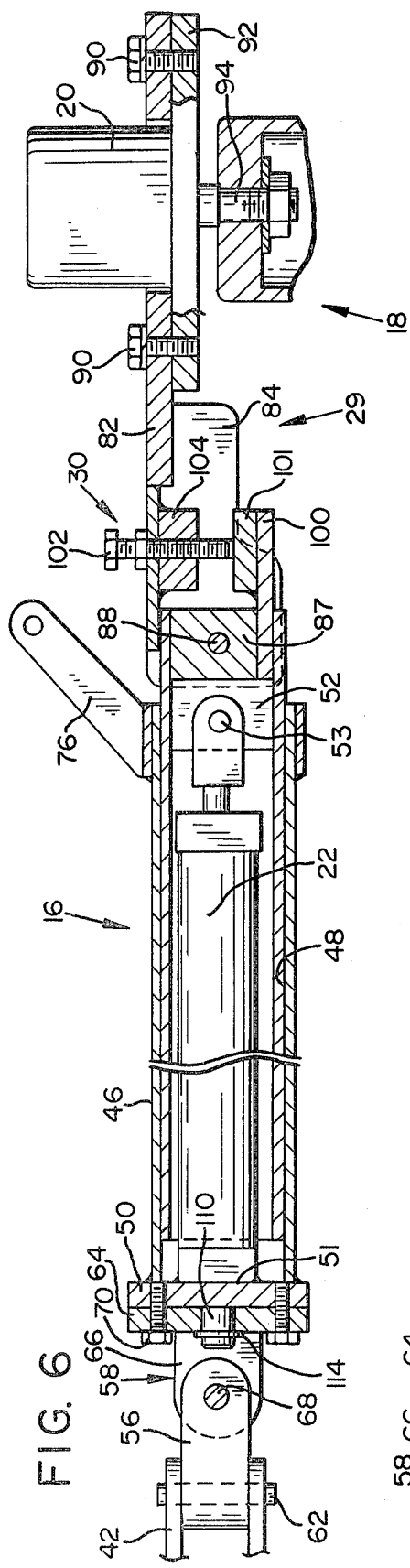
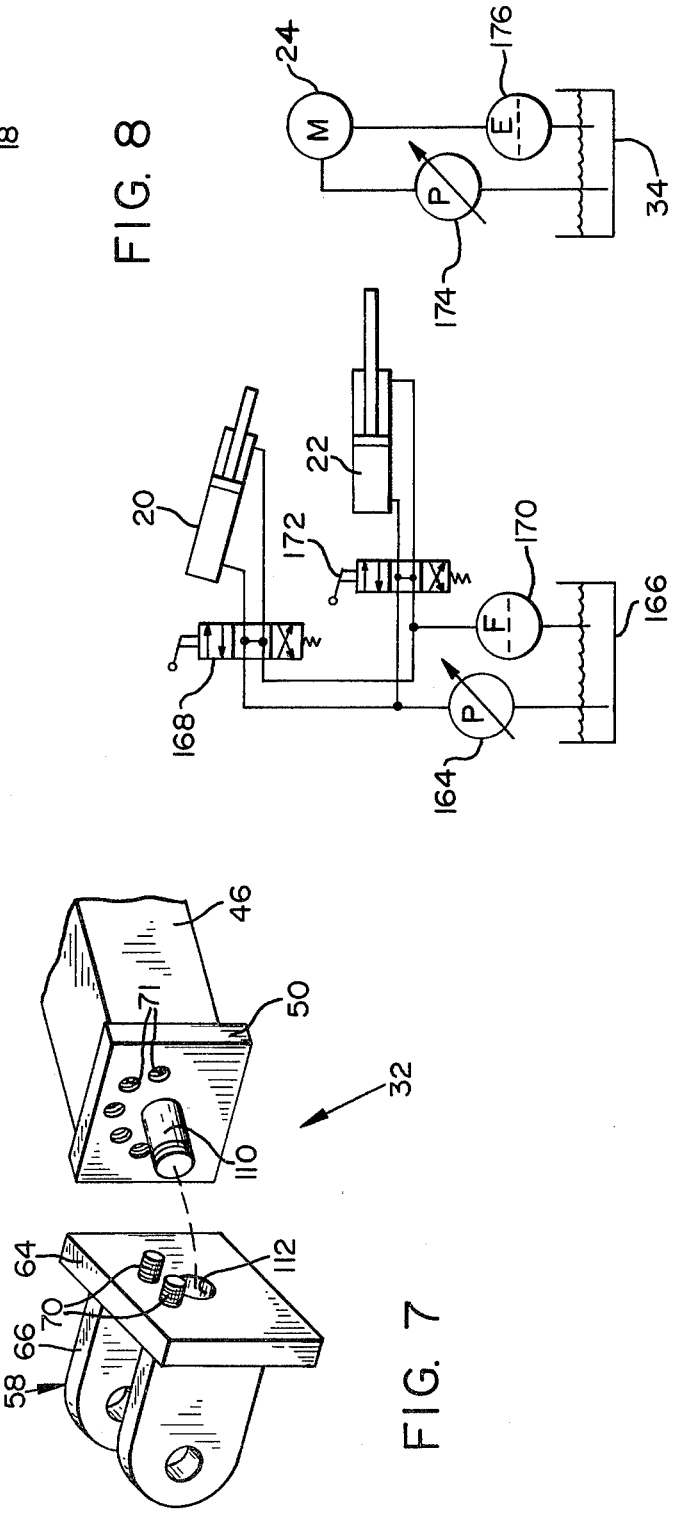

CULTIVATOR DEVICE FOR A VEHICLE

BACKGROUND OF THE INVENTION

This invention relates to cultivator attachments for vehicles such as tractors and particularly to such attachments with a rotatable cultivator member.

DESCRIPTION OF THE PRIOR ART

A number of cultivating and mowing devices are known which are towed behind a tractor and driven through gears and other mechanical linkages from a power take-off of the tractor. However, these devices suffer from a number of common problems. For example, because they are towed behind the tractor, they are difficult to operate because the driver must look both forwardly in the direction of travel to steer the tractor around obstacles and rearwardly to monitor the operation of the device. In addition, gear driven devices are subject to expensive and time consuming breakdowns due to failure of the mechanical drive components. The problem of mechanical failure is magnified by the rough terrain and conditions in which tractors commonly operate.

Some of the problems associated with these towed devices are partially solved by certain mower attachments mounted to the side of the vehicles. However, such devices are typically mechanically complex, which makes them extremely expensive to manufacture and maintain. Furthermore, during operation, many of these known devices cannot easily avoid obstacles in their path. When the operating head of one common type of such device approaches a tree, the entire vehicle must be steered away from the tree to move the head sufficiently to clear the tree. In other types of devices, such an obstacle is avoided by raising the entire operating head off of the ground and lifting it toward the vehicle a sufficient distance to clear. However, in the latter instance, when raised, the heat is not performing its desired operation.

In addition, applicant is not aware of any prior art cultivator devices in which both the fore and aft tilting of a cultivator head and side-to-side tilting of the head is controllable. This control enables the direction of discharge of material from the cultivator head to be predetermined.

Therefore, a need exists for a cultivator attachment for a vehicle directed toward the solution of these and other problems.

SUMMARY OF THE INVENTION

It is a primary object of the invention to provide an improved attachment for mounting to the side of a vehicle such as a tractor, the attachment including a rotating head for performing a desired operation such as cultivation or mowing.

It is another object of the invention to provide such an attachment capable of moving a cultivator head toward and away from the vehicle to avoid obstructions while the head continues to rotate and perform its desired operation.

Another object is to provide such an attachment with a telescoping boom section for moving the cultivator head inwardly toward and outwardly away from the vehicle.

A further object of the invention is to provide such an attachment with a hydraulically driven cultivator head with a cultivator member rotatable about its axis.

A still further object of the invention is to provide such an attachment with a boom assembly which can be raised and lowered to adjust the depth of cultivation and lift the attachment toward the vehicle as desired, such as during transportation from one field to the next.

A further object of the invention is to provide such an attachment in which the axis of the cultivator head is tiltable in the plane of the boom and the cultivator head may be orbited about the axis of the boom to thereby control the direction of discharge of the material from the head during cultivation.

Another object of the invention is to provide a cultivator attachment which is compact, mechanically simple, of relatively low manufacturing cost, reliable, and easy to operate, install and maintain.

Still another object of the invention is to provide a cultivator attachment which withstands impact with a minimal risk of damage and which includes a shock absorber mechanism for this purpose.

An additional object of the invention is to provide a cultivator head attachment having teeth oriented in a direction that facilitates cultivation of the soil.

Another object of the invention is to provide a cultivator attachment which is entirely hydraulically operated.

BRIEF DESCRIPTION OF THE DRAWINGS

The above and other objects, features and advantages of the invention will become apparent from the following description, when read in conjunction with the accompanying drawings, in which:

FIG. 1 is a top plan view of a cultivator attachment in accordance with the invention which is mounted to the side of a vehicle;

FIG. 2 is a side elevation view of the attachment of FIG. 1 with its extended operating position shown in solid lines and its raised transport position shown in dashed lines;

FIG. 3 is an enlarged view of a portion of a shock absorber mechanism of the cultivator attachment of the invention taken along lines 3—3 of FIG. 1;

FIG. 4 is a plan view of the undersurface of a cultivating member of the invention;

FIG. 5 is an enlarged view of one tooth of the cultivator member of FIG. 4;

FIG. 6 is a cross sectional view of the cultivator attachment taken along lines 6—6 of FIG. 1;

FIG. 7 is an enlarged partially disassembled view of a portion of a boom assembly and boom connector of the invention; and FIG. 8 is a schematic view of hydraulic circuits of the cultivator attachment.

DESCRIPTION OF A PREFERRED EMBODIMENT

With reference to FIGS. 1 and 3, a cultivator attachment in accordance with the invention is illustrated generally at 10 and includes a mounting portion 12 for mounting the attachment of the side of a vehicle, such as a tractor 14, a longitudinally extendable and retractable elongated boom assembly 16 and a cultivator head 18. In addition, a first hydraulic cylinder 20 is provided for raising and lowering the boom assembly and hence the cultivator head and a second hydraulic cylinder 22 (FIG. 6) within boom assembly 16 extends and retracts the boom. Also, a hydraulic motor 24 mounted on cultivator head 18 rotates a cultivator member 26 of the head about a first axis, which may be vertical, for cultivation purposes. A shock absorbing assembly 28 absorbs energy resulting from the boom assembly and cultivator head hitting a solid object and thus minimizes damages to the attachment from such impact. As explained below, an adjustment mechanism 30 is provided to control the side-to-side tilt of the cultivator member 26. That is, the tilt of the axis of the cultivator member in the plane of the axis of the boom. In addition, a fore-and-aft tilting mechanism 32 controls the front-to-rear tilt of the cultivator member 26. That is, the tilt of the axis of the cultivator member in a plane normal to the plane of the axis of the boom. Mechanisms 30, 32 cooperate to control the direction of discharge of material from the cultivator member as it rotates.

In the preferred embodiment, a hydraulic fluid tank 34 is an integral part of the mounting portion 12. This contributes to the compactness and self-contained nature of the attachment as the tank supplies fluid to hydraulic motor 24. In particular, mounting portion 12 includes a mounting bracket 36 secured to the tractor side of tank 34 and plural pins 38 (one being shown in FIG. 2) secure the bracket and hence tank 34 to the framework 40 of tractor 14. A lower set of ears 42, one above the other, project outwardly from the opposite side of tank 34 and provide a mounting to which boom assembly 16 is connected. The tank is attached to a lower portion of the tractor framework and the ears 42 are located approximately at the elevation of a plane containing the axes of the tractor axles. Consequently, the tractor end of the boom assembly is also approximately at this elevation making the boom and attachment a low profile device so that it easily operates under overhanging branches of trees in an orchard. Also, an upper set of laterally spaced ears 44 project from this side of tank 34 and comprise a mounting to which hydraulic cylinder 20 is connected. Ears 44 project outwardly a lesser distance than ears 42 so that they do not interfere with the lifting of the boom assembly upwardly and toward tractor 14, as shown in dashed lines in FIG. 2.

Boom assembly 16 includes a first boom section comprising a hollow cylindrical case 46 and a second extendable and retractable hollow boom section 48. As can be seen in FIG. 6, boom section 46 is sized for and receives boom section 48 in telescoping fashion. In addition, hydraulic cylinder 22 is positioned within the interior of the boom sections where it is protected from dirt and damage. A plate 50, secured to the tractor end of boom section 46, closes this section. The piston or case end 51 of cylinder 22 is secured to the interior surface of plate 50 while the rod end 53 of this cylinder is attached to a flange 52 adjacent the free end of and within the interior of boom section 48. Thus, extension and retraction of cylinder 22 slides boom section 48 relative to boom section 46 to cause a corresponding extension and retraction of boom section 48. Therefore, operation of cylinder 22 moves the cultivator head 18 along the axis of the boom assembly, in the direction of arrows 55 (FIG. 2), toward and away from the tractor. This motion is also illustrated in FIG. 1 with the cultivator head 58 shown in solid lines in one portion and in dashed lines in a retracted position. Cylinder 22 is controllable, as explained below, so that the boom assembly can be extended and retracted to any desired length within the structural limits of the cultivator attachment.

Thus, the cultivator head is easily moved in this fashion to avoid obstacles such as a tree in its path, without the need for steering the vehicle and while the cultivator head continues operating.

A swivel connector 56 and boom connector 58 (FIG. 6) connect the boom assembly 16 to ears 42 of the tank. These connectors are very short so that the tractor end of the two-section boom assembly is positioned near tank 34 and projects outwardly from a location adjacent a lower section of the tank. Swivel connector 56 has a first bore which is aligned with corresponding holes in ears 42. A pivot pin 62 is inserted within the aligned holes and bore to pivot swivel connector 56 to ears 42 and thereby to tank 34 and the tractor 14. Thus, the swivel connector and correspondingly the boom assembly are pivoted about a first axis normal to a plane containing the axes of the tractor axles. Boom connector 58 comprises a plate 64 and a set of laterally spaced apart ears 66 projecting from the tractor side of this plate. Holes through ears 66 are aligned with a bore through the free end of swivel 56 to accommodate a pin 68 which secures the boom connector 58 in place. Pin 68 is normal to pin 62 and thereby defines a second pivot axis about which the boom assembly is raised and lowered by cylinder 20. Bolts 70 are inserted in openings 71 to secure plate 64 to plate 50, thereby securing the boom assembly to the tractor. Also connecting the boom connector and boom assembly is a pin 110 connected to the center of the tractor side of plate 50, as by welding, and extending outwardly therefrom through a central opening 112 through plate 64. Pin 110 is retained in position by a stop or washer 114 connected to the pin at the tractor side of plate 64 and sized larger than opening 112. For purposes explained below, this connection permits relative rotation of plates 50, 64 when bolts 70 are removed and yet prevents these plates from pulling apart. Therefore, boom assembly 16 may be pivoted about the first axis of pin 62, raised and lowered about the second axis of pin 68, and turned or rotated within limits about its longitudinal axis.

Hydraulic cylinder 20 is provided to raise and lower the boom assembly about the axis of pin 68 as desired. A swivel connector 74, like swivel connector 56, joins one end, in the illustrated form the case end, of hydraulic cylinder 20 to ears 44 while the rod end of this cylinder is pinned at 77 to an ear or flange 76 projecting upwardly from boom section 46. As a result, as shown in FIG. 2, retraction of cylinder 20 raises the boom assembly about pin 68 in the direction of arrows 78 toward the tractor while extension of this cylinder moves the assembly and hence the cultivator head in the opposite direction. Also, the swivel connection of one end of cylinder 20 permits limited rotation of the boom section about its longitudinal axis without interference. As explained below, cylinder 20 is controllable to any desired position. For example, this cylinder can be extended to lower cultivator head 18 as it operates to increase the depth of cultivation of the soil. Conversely, it can be retracted to raise head 18 and decrease the cultivation depth. In addition, it can be fully retracted to bring boom assembly 16 almost vertical and adjacent to tractor 14 when desired to drive the tractor between fields. Simultaneously or alternately, boom assembly 16 can be retracted to make the attachment even more compact to facilitate transportation.

Cultivator head 18 is suspended from the free end of second boom section 48 by a cultivator head support assembly 29 which is best seen in connection with FIGS. 1 and 6. Assembly 29 includes a cultivator head support bracket 82 having a pair of side flanges 84, 86 which together comprise a yoke which is secured by a pin 88 to the free end of boom section 48. Pin 88 is oriented in a direction normal to the axis of the boom assembly and defines a third pivot axis about which the cultivator head may be pivoted as explained below. Bolts 90 secure the free end of bracket 82 to a cultivator head plate 92 to which the hydraulic motor 24 is attached. The cultivator member 26 is coupled to a rotatable shaft 94 projecting downwardly from motor 24 and driven by the motor in a conventional manner. This shaft comprises a fourth pivot axis and is along the axis of the cultivator head. Hence, the cultivator member 26 is rotatable about the axis shaft 94 and pivotal about pin 88. The use of a hydraulic motor 24 mounted to cultivator head 18 as the drive for cultivator member 26 is advantageous because it eliminates gears and complex mechanical linkages otherwise necessary for transmitting power from the tractor to the cultivator head. Such gears and linkages are prone to failure due to stresses of use and dirt and grit from the environment. A sealed hydraulic motor 24 minimizes these problems.

An adjustment mechanism 30 is provided for tilting the axis of the cultivator member in the plane containing the axis of the boom assembly, as shown by arrows 96 in FIG. 2. In the preferred embodiment, this mechanism comprises a means for rotating the cultivator head about the axis of pin 88. In the illustrated form, this mechanism comprises a flange 100 projecting from a lower portion of the free end of boom section 48 and a bolt 102 which is threaded to the portion of bracket 82 which overlays flange 100. Bolt 102 extends through a reinforcing block 104 attached to the undersurface of bracket 82. Also, the lower or free end of bolt 102 engages a wear plate 101 attached to the upper surface of flange 100. Bolt 102 limits the downward motion of the cultivator head 18 and establishes the position of the head about pin 88. During adjustment, bolt 102 is rotated about its axis to shift it axially toward or away from wear plate 101. This pivots the cultivator head 18 about pin 88 to a new position and adjusts the side-to-side tilt of the axis of the cultivator member. When the outermost portion of the cultivator member 28 is raised in this manner relative to its innermost portion, dirt is thrown away from the tractor during cultivation. Conversely, when tilted in the opposite direction, dirt is thrown inwardly toward the tractor. As a result, soil can be moved toward trees in an orchard or away from these trees as desired.

Additional control of the direction dirt is discharged from the cultivator head is provided by adjustment mechanism 32 for tilting the axis of the cultivator member in a plane normal to the plane of the boom axis. In the illustrated preferred embodiment, this fore-and-aft tilt mechanism is best seen in connection with FIGS. 6 and 7 and comprises the previously mentioned pin 110, opening 112, stop 114, bolts 70 and apertures 71. Plural openings 71 are provided through plate 50. Rotation of boom section 46 about its longitudinal axis rotates the boom assembly and orbits the connected cultivator head about the axis. Such rotation positions bolts 70 in alignment with a certain set of the openings 71. Additional rotation of boom section 46 positions these bolts in alignment with a different set of openings. Bolts 70 are inserted into a selected set of the aligned openings to hold the boom assembly 16 in a desired one of the possible positions. As a result, by selecting the desired position, the degree of fore-and-aft tilt of the axis of the cultivator member is determined. When the front portion of the cultivator member is lowered in this manner with respect to the rear portion, dirt is discharged rearwardly of the cultivator member during cultivation. In contrast, dirt is discharged forwardly when the front edge is raised relative to the rear edge. Bolts 70 are positioned above pin 110 for easy access. Also, pin 110 prevents separation of the boom assembly 16 from boom connector 58 when bolts 70 are removed and fore-and-aft tilt adjustment of the cultivator head is accomplished. Because the side-to-side tilt and front-to-rear tilt of the axis of cultivator member 26 can be independently established, the direction of discharge of dirt during cultivation can be accurately controlled as desired.

As previously mentioned, for shock absorbing purposes, a shock absorber mechanism 28 is provided. In a preferred embodiment, mechanism 28 includes a rigid link 120 connected at one end by a swivel connector 122, like connector 56, to boom section 46. The opposite end of link 120 is coupled by another swivel connector 124 to a yoke 126 of a shock connector rod 128. Rod 128 extends through the interior of a hollow tube 130 which is rigidly mounted to the bottom of tank 34. An externally threaded projecting end portion of rod 128 extends through an opening through a rear wall 132 of tube 130. A threaded stop or keeper 134 threaded onto the projecting end portion of rod 128 prevents the rod from pulling out from tube 130. In addition, a stop 136 is welded to the rod and a coil spring 138 is compressed between the interior surface of rear wall 132 and stop 136. With this construction, spring 138 absorbs energy resulting from impact of the cultivator head 18 or boom assembly 16 against solid objects such as trees. Furthermore, by rotating keeper 134, rod 128 is shifted axially and varies the tension on spring 138 and the shock absorbing capacity of mechanism 28.

With reference to FIG. 4, cultivator member 26 preferably comprises a rotating planar circular disc with plural teeth 140 projecting downwardly from its lower surface. As seen in FIG. 5, teeth 140 include a planar base 152 adapted for attachment to disc 26 and a planar tooth portion 154 of trapezoidal shape projecting perpendicularly from the base. These teeth are mounted, as by bolting base 152 to the undersurface of the cultivator member, with the leading edge 156 of the tooth pointed in the direction of rotation of the cultivator member as shown by the arrows 153 in FIGS. 5 and 6. In addition, it has been found that cultivation efficiency is varied by varying orientation of the teeth to vary an acute angle $\alpha$ (alpha). Alpha is the angle between a first line 158 tangent to the cultivator member and a second line 160 in the plane of the projecting tooth portion 154 and intersecting line 158 at the point 162 of tangency. Most efficient cultivation has been found to occur with the orientation of the teeth adjusted to establish the angle alpha at approximately forty-five degrees. At this angle, the teeth tend to cut the soil as the cultivator head is moved forwardly. That is, in the direction of travel 11 of the tractor.

Cylinders 20, 22 and hydraulic motor 24 are operated by respective conventional hydraulic control circuits as shown in FIG. 8. In particular, a pump 164 pumps hydraulic fluid from a tank 166 on the tractor through a three-way valve 168 to cylinder 120 and back through a filter 170 to tank 166. This pump also directs fluid through another three-way valve 172 to the cylinder 22, the filter 170 into tank 166. Valves 168, 172 are both manually controlled three-position valves operable such that, when in a neutral position, the length of cylinders 20, 22 remains fixed. In addition, when the valves are in a reverse position, the cylinders 20, 22 retract and when in a forward position the cylinders 20, 22 extend. Thus, valves 168, 172, which may be positioned conveniently within reach of the vehicle driver, provide a readily accessible means of controlling the cylinders 20 and 22.

In addition, a variable volume pump 174, driven by the power take-off of the tractor, pumps fluid from tank 34 on the attachment through motor 24, a filter 176, and back to the tank. By controlling the revolutions per minute of the tractor motor, the volume of fluid fed to motor 24 is varied and hence the speed of rotation of cultivator member 26 is controlled.

The operation of the preferred embodiment can be best understood in an orchard tilling application. As the tractor moves forward in the direction of arrow 11 (FIG. 1), the boom assembly can be raised or lowered about the axis of pin 68 by cylinder 20, as desired, to adjust the depth of cultivation. In addition, when the cultivator head 18 approaches a tree, the boom assembly can be retracted by cylinder 22 so that the head clears the tree without requiring the tractor to detour from its straight line motion. At the same time, when retracted, the cultivator motor continues operating so that tilling is uninterrupted. In addition, in the event the cultivator head 18 or boom assembly 16 hits a solid object such as a tree, the boom assembly pivots rearwardly about pin 62 and shock absorber assembly 28 absorbs the energy of impact. In addition, side tilt adjustment mechanism 30 enables the control of the side-to-side tilt of the axis of cultivator member 26 so that earth is directed toward or away from the tractor, and conversely away from and toward trees, as desired. In addition, through adjustment mechanism 32, the front-to-rear tilt of the axis of cultivator member 26 is also controlled. Thus, earth can be caused to discharge forwardly or rearwardly of the cultivator head depending on the desired application. As a result, a mechanically simple, reliable, and easily controllable cultivator attachment is provided.

Having illustrated and described the principles of my invention with reference to one preferred embodiment, it should be apparent to those skilled in the art that such invention may be modified in arrangement and detail without departing from such principles. For example, although the preferred embodiment refers to a cultivator head, it is to be understood that the invention includes heads with a rotating member operable for other functions as well. For example, a mower head with rotating blades.

I claim as my invention all such modifications as come within the true spirit and scope of the following claims:

1. A cultivator attachment comprising:
   mounting means for connection to the side of a vehicle;
   a boom assembly including first and second elongated boom sections with the second boom section telescopingly connected to said first boom section for extension and retraction;
   boom connector means for pivotally connecting said first boom section to said mounting means such that the outer end of said boom assembly is movable upwardly and downwardly and projects outwardly from the side of a vehicle in a direction generally normal to the longitudinal axis of the vehicle;
   cultivator head means mounted to the free end of said second boom section, said cultivator head means including a cultivator member mounted for rotation about the axis of the cultivator head;
   first hydraulic cylinder means for moving the outer end of the boom assembly upwardly and downwardly;
   second hydraulic cylinder means for extending and retracting said second boom section;
   hydraulic motor means mounted to said cultivator head means for rotating said cultivator member to cultivate soil;
   side tilt means for tilting the axis of the cultivator head in a plane containing such axis and the longitudinal axis of the boom to move the cultivator member away from or toward the vehicle to control the discharge of material from the cultivator head;
   fore-and-aft tilt means for moving the cultivator head orbitally about the longitudinal axis of the boom to move the cultivator member forwardly or rearwardly;
   said side tilt means and said fore-and-aft tilt means at least partially controlling the discharge of material from the cultivator head during cultivation;
   said boom connector means pivoting said first boom section to said mounting means for motion forwardly and rearwardly in a plane normal to the plane of upward and downward movement of the boom section, and said attachment including shock absorbing link means extending from said boom assembly to said mounting means for absorbing energy resulting from impact between said boom assembly or cultivator head and a solid object.

2. A cultivator attachment according to claim 1 in which said shock absorbing link means extends from said first boom section to a position on said mounting means rearwardly of said boom connector means, said shock absorbing link means including a link pivotally connected at one end to said first boom section, an elongated shock connector rod pivoted to the other end of said link, a hollow tube connected to said mounting means in a position and sized to slidably receive said shock connector rod therein, said tube having a rear wall, said shock connector rod extending from one end of said tube through the interior of said tube and including an externally threaded portion projecting outwardly through the rear wall of the tube, a coil spring surrounding said shock connector rod and positioned for compression between the rear wall of the tube and the link to absorb shock, and an internally threaded stop threadedly mounted to the projecting portion of said shock connector, whereby rotating the threaded stop causes it to move axially on the shock connector rod to thereby adjust the compression of the coil spring and in turn the shock absorbing characteristics of the shock absorbing link means.

3. A cultivator attachment according to claim 1 in which said side tilt means comprises a cultivator head support which carries said cultivator head and which is pivoted to the free end of said second boom section for motion about a cultivator support pivot axis which is normal to the longitudinal axis of the boom assembly, said side tilt means also including side tilt adjustment means for pivoting said cultivator support and thereby the cultivator head about such cultivator support pivot axis to tilt the cultivator member from side-to-side.

4. A cultivator attachment according to claim 3 in which said second boom section includes a lower flange portion which projects outwardly beyond said cultivator support pivot axis, said cultivator head support being mounted to said second boom section so as to overlay at least a portion of said flange, said side tilt adjustment means comprising a threaded adjustment screw threadedly connected to the overlaying portion of said cultivator head support with its free end engaging the flange, said adjustment screw being rotatable so as to shift it axially and thereby pivot the cultivator head support about the pivot axis so as to tilt the cultivator member outwardly away from and inwardly toward the vehicle.

5. A cultivator attachment according to claim 1 in which said first boom section includes a generally hollow case which has a first plate at one end and is open at its free end to telescopingly receive the second boom section, said boom connector means including a second plate abutting said first plate, the first and second plates being rotatably connected together such that the case and boom assembly are rotatable about their longitudinal axes to orbit the cultivator member and cause fore-and-aft tilting of the cultivator member, said first and second plates each defining plural apertures therethrough positioned such that at least one aperture of each plate is aligned with a corresponding aperture of the other plate whenever the plates are in a desired operating position, there being plural such desired operating positions, a keeper being insertable through the aligned apertures to maintain the plates in the desired operating position and hence maintain a desired fore-and-aft tilt of the cultivator member.

6. A cultivator attachment according to claim 1 in which said mounting means includes a mounting bracket adapted to be mounted to the vehicle and a hydraulic fluid tank connected to said mounting bracket, said boom connector comprising means for connecting said boom assembly to said tank, one end of said first hydraulic cylinder being connected to said tank, and said tank comprising a source of hydraulic fluid for said hydraulic motor means.

7. A cultivator attachment comprising:
mounting means for connection to the side of a vehicle;
a boom assembly including first and second elongated boom sections with the second boom section telescopingly connected to the first boom section for extension and retraction;
boom connector means for connecting said first boom section to said mounting means such that said boom assembly is movable in horizontal and vertical planes and projects outwardly from the side of the vehicle in a direction generally normal to the longitudinal axis of the vehicle;
cultivator head means mounted to the free end of said second elongated boom section, said cultivator head means including a cultivator member which is in a reference plane when the cultivator head is in one operating position and which is mounted for rotation about an axis normal to the reference plane;
shock absorbing means extending from said boom assembly to said mounting means for absorbing energy resulting from impact between said boom assembly and cultivator head and a solid object;
said tilt means for tilting the side edges of the cultivator member relative to the reference plane to direct the discharge of material from the cultivator member away from or toward the vehicle;
fore-and-aft tilt means for tilting the front and rear edges of the cultivator member relative to the reference plane to cause the discharge of material forwardly or rearwardly of the cultivator head member during cultivation;
first hydraulic cylinder means for raising and lowering the boom assembly in a vertical plane;
second hydraulic cylinder means for extending and retracting said second boom section; and
hydraulic motor means mounted to said cultivator head means for rotating said cultivator member about a vertical axis to cultivate soil.

8. A cultivator attachment according to claim 7 in which said side tilt means comprises a cultivator head support which carries said cultivator head and which is pivoted to the free end of the second boom section for motion about a cultivator head support pivot axis, the cultivator head support pivot axis extending normally to the longitudinal axis of the boom assembly, and means for pivoting the cultivator support and hence the cultivator head about such cultivator head support pivot axis to tilt the side edges of the cultivator member; and
said fore-and-aft tilt means comprising means for connecting the boom assembly to said mounting means such that the boom assembly is rotatable about its longitudinal axis to tilt the front and rear edges of the cultivator member.

* * * * *

UNITED STATES PATENT AND TRADEMARK OFFICE
CERTIFICATE OF CORRECTION

PATENT NO. : 4,332,299
DATED : June 1, 1982
INVENTOR(S) : Alvin L. Parks

It is certified that error appears in the above—identified patent and that said Letters Patent is hereby corrected as shown below:

Column 1, line 41, "heat" should be --head--.

Column 2, line 62, "of the side" should be --to the side--.

Column 3, line 50, "the boom sections" should be --these boom sections--.

Column 10, line 20, "said" should be --side--.

Signed and Sealed this

Twenty-sixth Day of October 1982

[SEAL]

Attest:

GERALD J. MOSSINGHOFF

Attesting Officer    Commissioner of Patents and Trademarks